June 9, 1931.     V. G. APPLE     1,808,748
ELECTRIC MOTOR AUTOMOTIVE AXLE
Filed June 14, 1928     4 Sheets-Sheet 1
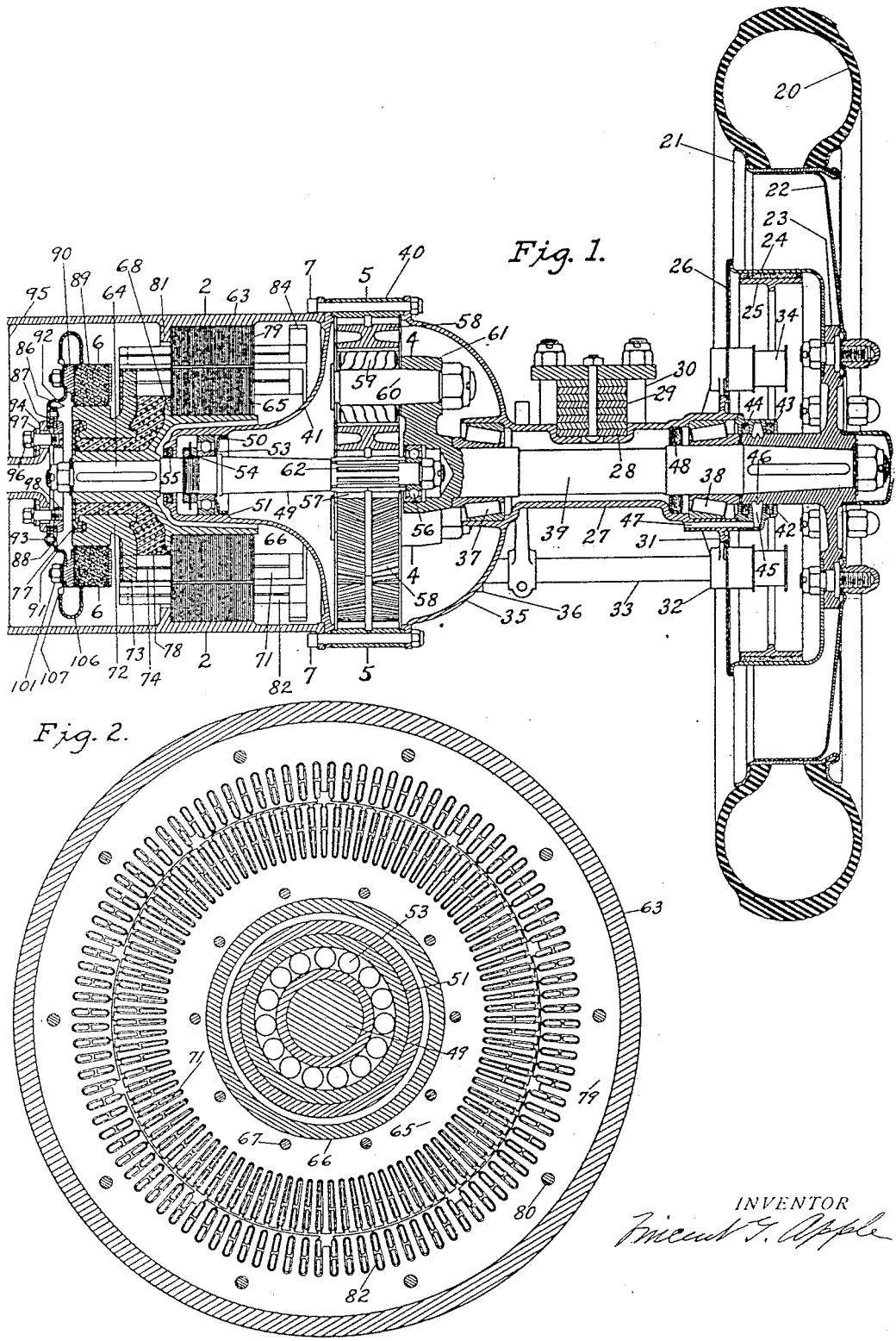
INVENTOR
Vincent G. Apple

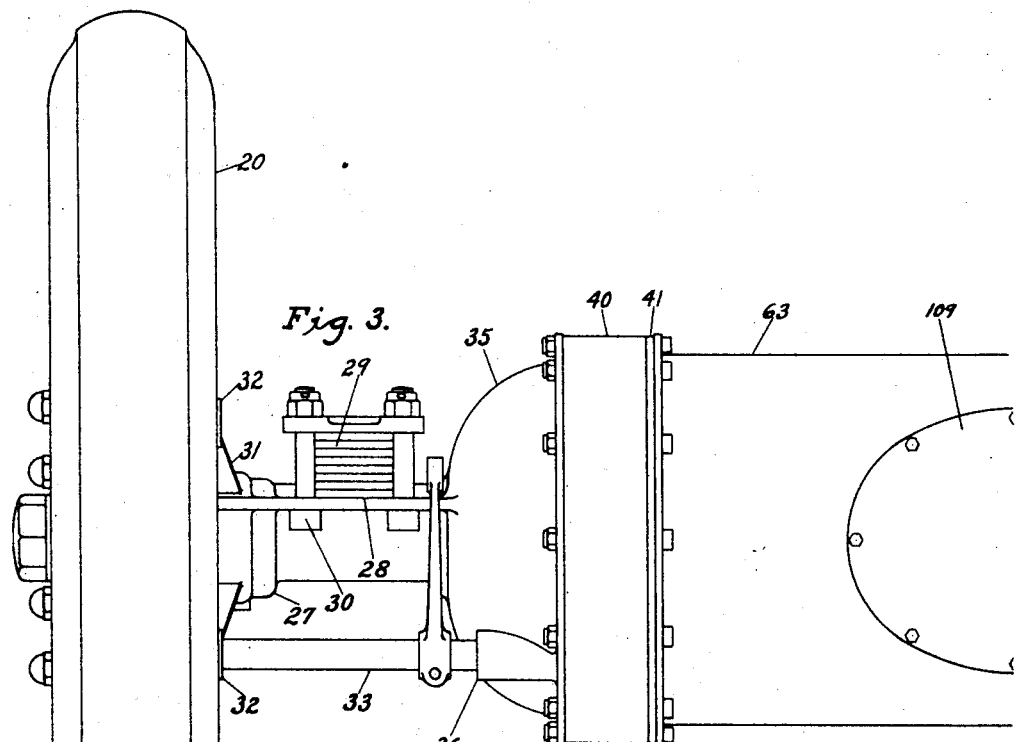
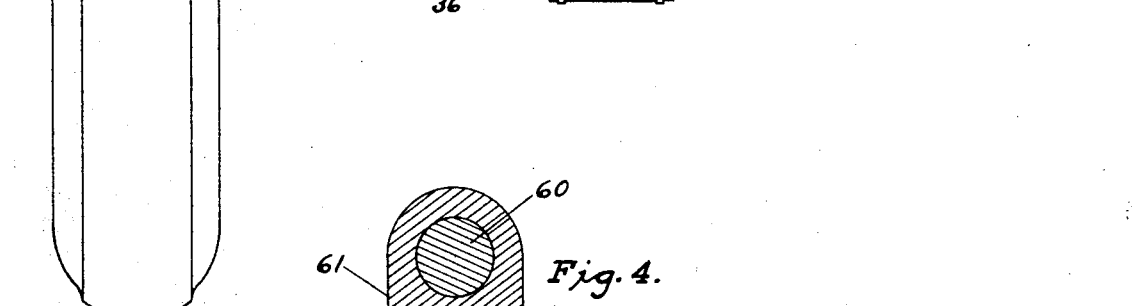

June 9, 1931.  V. G. APPLE  1,808,748
ELECTRIC MOTOR AUTOMOTIVE AXLE
Filed June 14, 1928    4 Sheets-Sheet 3

INVENTOR
Vincent G. Apple

June 9, 1931.   V. G. APPLE   1,808,748
ELECTRIC MOTOR AUTOMOTIVE AXLE
Filed June 14, 1928    4 Sheets-Sheet 4
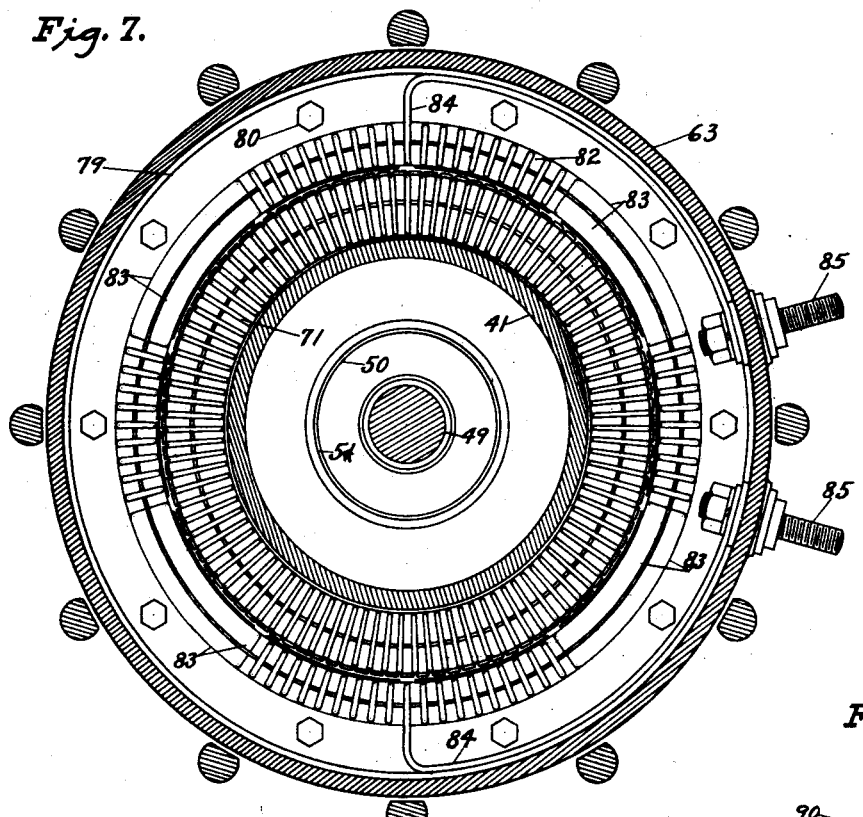
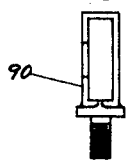
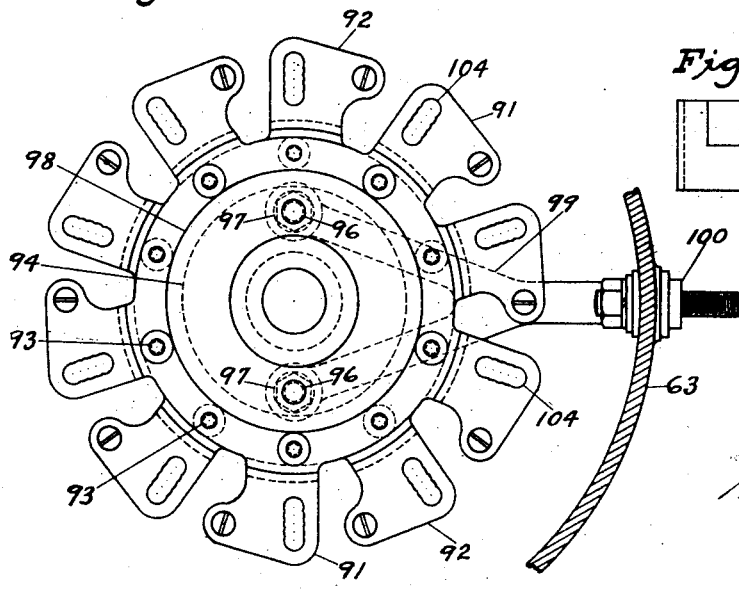
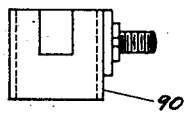
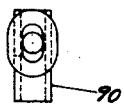
INVENTOR Patented June 9, 1931

1,808,748

UNITED STATES PATENT OFFICE

VINCENT G. APPLE, OF DAYTON, OHIO

ELECTRIC MOTOR AUTOMOTIVE AXLE

Application filed June 14, 1928. Serial No. 285,375.

My invention relates to improvements in electric motor automotive axles in which two separate motors are employed, one for each wheel, the revolution speed of the motors being independent of each other, a structure which eliminates the differential gearing required on ordinary automotive axles, where a single source of power must drive each wheel at a speed independent of the speed of the other.

One of the objects of my improvements is to provide for unusually large torque requirements by connecting relatively high speed motors of large power and small diameter thru suitable reduction gearing to the relatively low speed axle shafts in coaxial relation with each other and within a portion of the axle substantially corresponding in diameter and location to the differential housing of the ordinary automotive axle, to the end that the same road clearance may be maintained, yet adequate power supplied, the axle thus being a self contained power plant which need be connected by cable only, to a source of current supply, all rotative elements being contained within the housing.

Another object of my improvements is to so partition each half of the axle housing as to provide in each half two separate compartments, and to so distribute the elements of the mechanism that all gears, bearings, etc., requiring lubrication may be contained in one compartment, while motor elements, to which oil is objectionable, may be contained in the other compartment, to the end that lubrication of the parts may be simplified and the electrical elements, particularly the commutator and brushes, being free from grease, may operate more efficiently.

A further object is to provide a rigid structure of few parts requiring substantially no adjustment over extended periods, but which are readily accessible for renewal or repair, to the end that the severe service requirements of an installation of this kind may be met.

These and other objects are attained by the structure illustrated in the accompanying drawings in which—

Fig. 1 is a longitudinal-vertical cross section thru one half of the axle.

Fig. 2 is a cross section, to an enlarged scale, taken at 2—2 of Fig. 1 (thru discs).

Fig. 3 is a rear elevation of the other half of the axle.

Fig. 4 is a cross section taken at 4—4 of Fig. 1.

Fig. 7 is a cross section taken at 7—7 of Fig. 1.

Fig. 8 is an end view of the brush spider with brush holders removed.

Figs. 9, 10 and 11 are plan, front and side elevations respectively of one of the brush holders.

Similar numerals refer to similar parts thruout the several views.

Figure 5:
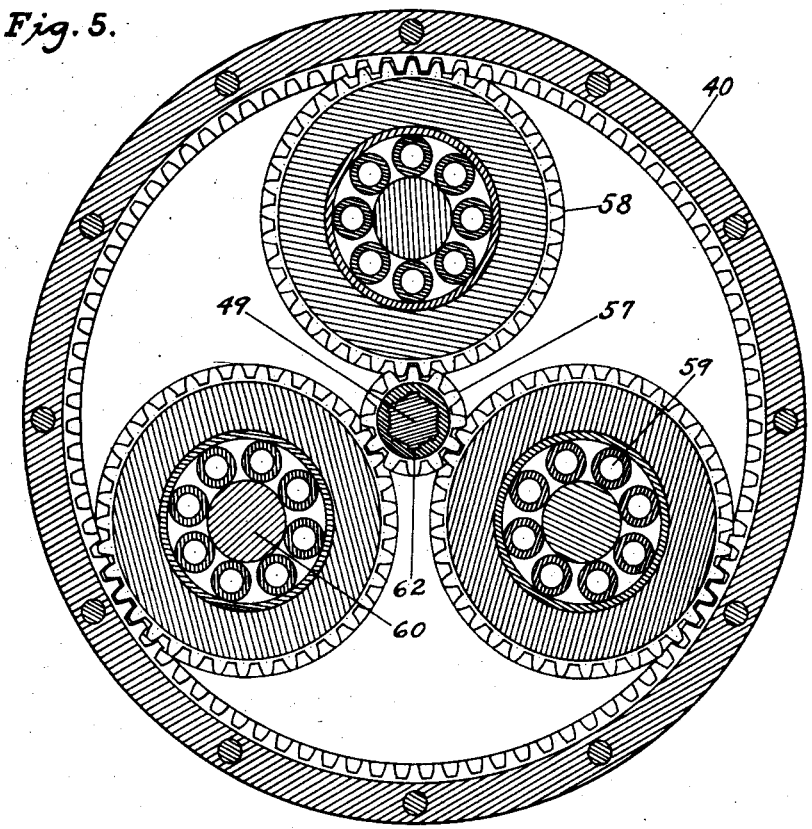
Fig. 5 is a cross section taken at 5—5 of Fig. 1.
Figure 6:
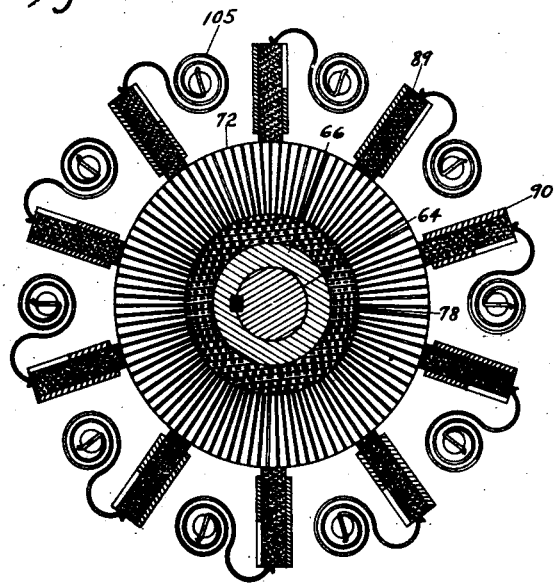
Fig. 6 is a cross section taken at 6—6 of Fig. 1.

The tire 20, rim 21, disc 22, hub 23, brake drum 24, brake shoe 25 and dust cover 26 are standard parts such as are used in ordinary mechanically driven axles.

A housing 27 has a seat 28 for leaf spring 29 held in place on the housing by bolts 30. The leaf spring forms the means of connection between the axle and the vehicle.

At one end of housing 27, arms 31 terminate in hubs 32 to support the brake shoe operating shafts 33 and studs 34 used in ordinary practice. The other end of housing 27 is flanged outwardly to form a cover 35 which forms part of the enclosure for the reduction gearing.

Hubs 36 on the outside surface of cover 35 supply bearings for end of brake shoe operating shaft 33, the other end being supported in hubs 32. Housing 27 carries bearings 37 and 38 which furnish rotative support for axle shaft 39.

A ring 40, together with housing 27 and a partitioning member 41 completely enclose all gears and bearings. At the end where the axle shaft 39 must extend from the enclosure into hub 23 to drive the wheel, a cap 42 carries felt washers 43 and 44 separated by a groove 45. Most of the lubricant which passes felt washer 43 is thrown off of the hub by oil throw 46 into groove 45 and is carried by opening 47 away from the brake parts and tire. The small amount of lubricant which may pass oil throw 46 and groove 45 is absorbed by felt washer 44. Felt washer 48 provides against a too rapid supply of lubricant to bearing 38 from the main source.

At the end where the motor shaft 49 enters the gear and bearing housing, lubricant is restrained by oil throw cup 50 which substantially fits, but does not touch bearing seat 51. A thread is cut on the outside surface of cup 50, the thread being of such hand as will, at forward movement of the vehicle, drive the lubricant back toward the main supply. Sufficient oil passes throw cup 50 to lubricate bearing 53 and that which passes outwardly along shaft 49 is thrown off by oil throw 54. Felt washer 55 absorbs the small amount of lubricant which reaches it. Motor shaft 49 is supported at the other end by bearing 56 which has a seat in the cupped end of axle shaft 39, thus maintaining axial alignment of the two shafts.

The reduction gearing is of the planetary type comprising a pinion 57, the ring gear 40, and three intermediate idler gears 58. The ring gear 40 forms part of the housing which encloses the gear train, the teeth being cut on the internal diameter of the ring. The idler gears 58 revolve on roller bearings 59 supported on studs 60, which have a tapered end extending into suitable seats in arms 61 extending outwardly from axle shaft 39. The teeth of the gears are cut to herringbone form, and to facilitate assembly, pinion 57 is made in two halves, half of the pinion to be entered from one side and half from the other. The inside of the pinion is splined and it is driven by corresponding splines 62 on motor shaft 49.

The reduction gear as constructed is particularly applicable to the present invention, as it provides, with fewest gears, the greatest reduction, efficiency considered, that may be had in a given diameter, such diameter substantially corresponding to the required motor diameter and being in axial alignment therewith, the whole coming substantially within the diameter of a differential housing used on an ordinary mechanically driven axle.

While there are other forms of gear trains which give greater reduction with fewer gears in a given diameter than the one here employed, they are not appropriate for this service since they do not reverse, for while the high speed member will drive the low speed member, the low will not in turn drive the high, so that a vehicle employing such a gear cannot coast and drive its power unit by the momentum of the vehicle, as may be done with the type of gear train here employed.

The motor housing 63 comprising the middle portion of the axle is of cylindrical form and supplies a separate compartment wherein the electric motor elements are contained. The partitioning member 41 effectually separates this compartment from that which contains the gears and bearings. Motor shaft 49 has the bearings upon which it depends for rotative support entirely within the gear and bearing compartment, but a stub end 64 extends thru and into the motor housing, the motor armature being mounted thereon.

The motor armature comprises a core consisting of a series of laminæ 65 mounted on hub 66. Rivets 67 passing thru the laminæ and thru an outwardly extending annular rib 68 secure the core to the hub. The usual key and nut secure the armature to the shaft.

A single closed wave connected bar winding 71 is provided and applied according to my patented methods, the current thru the armature winding being in two equal parallel paths. After the winding is applied as described, commutator segments 72 are arranged in cylindrical formation, each segment having a riser 73 which comes alongside a pair of conductor ends 74 and is welded thereto.

After welding the armature is placed in a mold along with a cupped shape member 77 in proper relative position, and fluid insulating material, or insulating material made fluid by heat or otherwise, is poured or pumped into the space remaining within the mold as at 78, and hardened or allowed to harden by heat or otherwise to form a solid structure as shown. The cup member 77 offers great resistance to the centrifugal force acting outwardly on the commutator segments at high rotative speed.

The field element of the motor comprises a core consisting of a series of laminæ 79 secured to housing 63 by screws 80 which extend thru holes in the laminæ and into tapped holes in an annular rib 81 extending inwardly from the housing. A single closed lap connected bar winding 82 is provided, and divides the field into ten poles. By special coils 83 and terminal taps 84 (see Fig. 7) the lap connected bar winding is divided into two equal parallel paths, the same as in the armature, instead of being divided into ten equal parallel paths as in the ordinary lap winding.

The method of dividing a multipolar single turn bar lap winding into two equal parallel paths is described in my co-pending application Serial Number 202,138. The advantage to the present invention, of so dividing the winding is, that the same number of turns arranged in two equal parallel paths has twenty-five times the resistance as when arranged into ten equal parallel paths so that, voltage being equal, a single turn bar winding may be used when in two parallel paths while for a winding arranged in ten parallel paths a single turn bar winding could not be used, but a multiple turn or wire wound element having five turns per slot would necessarily be employed to obtain a like result.

Since a single turn bar winding requires much less space this method results in a field element of less dimensions, both as to diameter and length, for a given power. The terminal taps 84 are brought to conveniently located binding posts 85 for connection to the current source.

A spider composed of a positive plate 86, negative plate 87 and a washer 88 of insulating material, together with brushes 89 and brush holders 90 constitute the brush rigging. Legs 91 and 92 extend alternately, one from plate 86 and the next from plate 87, to provide support for brush holders 90.

Rivets 93 alternate, one to secure plate 86 to insulation washer 88 and the next to secure plate 87 to insulation washer 88. Five brushes are thus attached to the positive plate 86 and five to the negative plate 87. A flanged hub 94 extends from partition 95 of housing 63 to support the brush rigging. Screws 96 extend thru insulating bushings 97 into clamp plate 98 and when tightened securely hold the brush rigging in place. A forked plate 99 having its ends under the heads of screws 96 (see Fig. 8) conveys the current from a conveniently located binding post 100. Nuts 101 hold brush holders 90 secured to legs 91 and 92. Slotted holes 104 in the legs permit moving the brush holders inwardly as the commutator is reduced in diameter by resurfacing.

The usual springs 105 supply tension for the brushes and the usual flexible leads 106 insure electrical connection between brushes and holders. The circuit is from binding post 100 thru forked plate 99 thru screws 96 thru clamp plate 98 thru positive plate 86 thru five brush holders 90 and brushes 89 thru armature thru other five brushes and holders 89 and 90 thru negative plate 87 to ground on hub 94. By loosening screws 96 the entire brush rigging may be revolved about the axis so that when renewing brushes one after another can be brought toward the operator and replaced.

By loosening a nut 101 and removing slotted terminal 107, then raising spring 105 a brush may be removed from its holder. An opening 108 having a cover 109 permits ready access to the brushes for inspection or renewal.

I am aware that no single element of the structure described involves invention per se, but it is thought that the manner in which the several elements are combined to attain the objects set forth produce a new and useful result; consequently I claim—

1. The combination of an electric motor automotive axle, of a relatively low speed axle shaft, a relatively high speed motor and reduction gearing, the axle shaft being driven thru the reduction gearing by the shaft of the high speed motor, a housing surrounding said motor, said gearing and said axle shaft, said housing being partitioned into two separate compartments, said gearing and bearings for said shafts being in the one compartment, and said motor being in the other compartment, the shaft of the high speed motor extending into the motor compartment to support the rotative element of the motor but having no rotative support in said motor compartment.

2. The combination in an electric motor automotive axle, of a housing, a relatively high speed shaft, a relatively low speed shaft and reduction gearing, all within said housing, the high speed shaft being adapted to drive the low speed shaft thru said reduction gearing, bearings for rotative support of said shafts within said housing, a stub end of the high speed shaft extending from within said housing at one part thereof and a stub end of said low speed shaft extending from within said housing at another part thereof, an electric motor having its rotative element mounted on the stub end of said high speed shaft without other rotative support and an automotive wheel adapted to be driven by the stub end of said low speed shaft.

3. The combination in an electric motor automotive axle, of a relatively high speed shaft and a relatively low speed shaft in coaxial alignment, reduction gearing interposed between said shafts thru which said high speed shaft may drive said low speed shaft, a substantially oil tight housing entirely surrounding said gearing and said shafts, except that a stub end of one shaft extends thru and beyond the housing at one end thereof and a stub end of the other shaft extends thru and beyond the housing at the other end thereof, bearings for rotative support of said shafts entirely within said housing, the rotative element of an electric motor mounted on said stub end of said high speed shaft without other rotative support and an automotive wheel mounted on said stub end of said low speed shaft without other rotative support.

4. The combination of an electric motor automotive axle, of two co-axially extending shafts, a gear train interposed between said shafts and adapted to permit either shaft to drive the other, bearings for said shafts, a substantially oil tight housing enclosing said gears, said bearings and said shafts, except insofar as a stub end of each shaft projects to the outside of said housing, the rotative element of an electric motor mounted on one projecting stub end and an automotive wheel mounted on the other projecting stub end, neither said rotative element nor said wheel having other rotative support except as provided by said bearings within said housing.

5. The combination in an electric motor automotive axle, of a cylindrical housing, an internal ring gear having pitch diameter substantially as large as the housing, a motor shaft extending coaxially with said cylindrical housing, a relatively small pinion at one end of said shaft, a motor armature at the other end of said shaft and bearings for rotative support of said shaft, an axle shaft extending coaxially with said housing, arms at one end of said axle shaft, studs in said arms, planet pinions on said studs, whereby said pinion and said ring gear are connected in geared relation, an automotive wheel at the other end of said axle shaft, bearings for said axle shaft, a motor field element mounted in said housing in coaxial relation with said armature, a brush rigging mounted in said housing in coaxial relation with said armature and a partition separating said housing into two compartments in such a manner that said field, armature and brush rigging are in the one said compartment and the bearings and gears are in the other said compartment.

6. In an electric motor axle, the combination of an oil containing compartment, two solid shafts wholly within said compartment except for a stub end of each shaft extending from said compartment, bearings for said shafts wholly within said compartment, reduction gearing wholly within said compartment connecting the said shafts, an electric motor armature supported in overhung fashion on the stub end of one said shaft with the commutator at the outer end of said stub, and an automotive vehicle wheel mounted in overhung fashion on the stub end of the other said shaft.

7. In combination a structure as defined in claim 6 and a motor housing concentrically surrounding said armature and supported on said compartment.

In testimony whereof I hereunto sign my name.

VINCENT G. APPLE.